US012757034B2

(12) United States Patent
Iwakuni et al.

(10) Patent No.: US 12,757,034 B2
(45) Date of Patent: Oct. 6, 2026

(54) JUDGMENT METHOD AND WIRELESS COMMUNICATION APPARATUS

(71) Applicant: NTT, Inc., Tokyo (JP)

(72) Inventors: Tatsuhiko Iwakuni, Musashino (JP); Daisei Uchida, Musashino (JP); Takuto Arai, Musashino (JP); Shuki Wai, Musashino (JP); Naoki Kita, Musashino (JP)

(73) Assignee: NTT, Inc., Tokyo (JP)

( * ) Notice: Subject to any disclaimer, the term of this patent is extended or adjusted under 35 U.S.C. 154(b) by 285 days.

(21) Appl. No.: 18/294,491

(22) PCT Filed: Aug. 6, 2021

(86) PCT No.: PCT/JP2021/029274

§ 371 (c)(1),
(2) Date: Feb. 1, 2024

(87) PCT Pub. No.: WO2023/013016

PCT Pub. Date: Feb. 9, 2023

(65) Prior Publication Data

US 2024/0292231 A1 Aug. 29, 2024

(51) Int. Cl.
*H04W 16/28* (2009.01)

(52) U.S. Cl.
CPC .................................. *H04W 16/28* (2013.01)

(58) Field of Classification Search
CPC .. H04B 7/06952; H04B 7/0408; H04B 7/061; H04B 7/0617; H04W 16/28; H04W 84/12
See application file for complete search history.

(56) References Cited

U.S. PATENT DOCUMENTS 9,253,592 B1 * 2/2016 Moscovich ............. H04W 4/80
9,419,785 B1 * 8/2016 Lin ..................... H04L 27/2657
9,609,468 B1 3/2017 Moscovich et al.
(Continued)

FOREIGN PATENT DOCUMENTS

EP 1640738 A1 3/2006
EP 3793277 A1 3/2021
JP 2015-084576 A 4/2015

OTHER PUBLICATIONS

Takinami et al., "Standardization Trend and Elemental Technology for Millimeter Wave Band Radio LAN System", IEICE Communication Society Magazine, Autumn 2016, No. 38, 2016, pp. 100-106.
(Continued)

*Primary Examiner* — Cindy Trandai
(74) *Attorney, Agent, or Firm* — Harness, Dickey & Pierce, P.L.C.

(57) ABSTRACT

A determining method which is executed by a radio communication device includes a radio step of executing a radio communication, using two or more directional beams selected from a plurality of directional beams; and a determination step of determining which of line-of-sight waves and reflected waves is used for the executed radio communication, on the basis of an amount of variation in directions between the two or more directional beams used at different times. The determination step includes determining that the executed radio communication is radio communication using the reflected waves, when the amount of variation is equal to or greater than a threshold value.

4 Claims, 5 Drawing Sheets

(56) References Cited

U.S. PATENT DOCUMENTS

| | | | | |
|---|---|---|---|---|
| 2012/0220239 | A1 | 8/2012 | Hosoya et al. | |
| 2019/0052345 | A1* | 2/2019 | Yunoki | H04B 7/06952 |
| 2021/0099217 | A1* | 4/2021 | Ota | H04B 7/0695 |
| 2021/0135728 | A1* | 5/2021 | Raghavan | H04B 17/336 |
| 2022/0116801 | A1* | 4/2022 | Dallal | H04B 7/0632 |
| 2022/0140885 | A1* | 5/2022 | Vieira | H04B 7/0426 375/267 |
| 2023/0124953 | A1* | 4/2023 | Kanemoto | H04W 72/541 455/63.1 |

OTHER PUBLICATIONS

IEEE, "Part 11: Wireless LAN Medium Access Control (MAC) and Physical Layer (PHY) Specifications Amendment 3: Enhancements for Very High Throughput in the 60 GHz Band", (IEEE Std 802.11 ad-2012), Dec. 28, 2012.

Taira et al., "A Performance of Channel Estimation Schemes for Multi-Carrier Systems", The Transactions of the Institute of Electronics, Information and Communication Engineers B, vol. J88-B, No. 4, 2005, pp. 751-761.

* cited by examiner

JUDGMENT METHOD AND WIRELESS COMMUNICATION APPARATUS

CROSS-REFERENCE TO RELATED APPLICATIONS

This application is a 371 U.S. National Phase of International Application No. PCT/JP2021/029274, filed on Aug. 6, 2021. The entire disclosure of the above application is incorporated herein by reference.

TECHNICAL FIELD

The present invention relates to a judgment method and a wireless communication apparatus.

BACKGROUND ART

As a standard for a radio communication system that uses millimeter waves and quasi-millimeter waves, "3rd Generation Partnership Project 5th Generation New Radio (3 GPP 5G NR)" and "IEEE 802.11 ad" are known. The millimeter waves and the quasi-millimeter waves are divided into high frequency bands. The radio communication system using such a high frequency band can secure a wide band as compared with a radio communication system using a microwave band. In the radio communication system using a high frequency band, since the radio wave used as a carrier wave has high linearity, interference with other radio communication systems is small. For this reason, as a means for realizing a large capacity of radio communication, a radio communication system using a high frequency band has been put into practical use (see NPD 1).

The higher the frequency of the radio wave is, the larger the distance attenuation in the propagation path of the radio communication is. Therefore, in a radio communication system using a millimeter wave band, a radio communication device forms a directional beam for concentrating transmission power toward another radio communication device being a communication partner. That is, the radio communication device transmits a radio signal to another radio communication device which is a communication partner by performing beam forming. Another radio communication device, which is a communication partner, may form a directional beam and receive a radio signal.

FIG. 5 is a diagram showing an example of a radio communication device 200 that uses beam forming in a millimeter wave band. The radio communication device 200 selects a directional beam 201 whose reception power is a maximum in a radio communication device 300 opposite to the radio communication device 200 from a plurality of formable directional beams (directional beam 201-1 to directional beam 201-9). In IEEE 802.11ad, the radio communication device 200 selects a directional beam 201 on the basis of a sector level sweep (SLS) (refer to NPD 2).

The radio communication device 200 which is a side (initiator) starting communication sequentially transmits the radio signals to the radio communication device 300 in a time division manner, using a directional beam 201 sequentially transmitted from the directional beam 201-1 to the directional beam 201-9. That is, the radio communication device 200 transmits the radio signal to the radio communication device 300 in a time division manner by executing sequential transmission (beam sweep) of the directional beam.

The radio communication device 300 which is a side (responder) responding to communication receives the signal transmitted from the radio communication device 200 in a time division manner, using the sequentially transmitted directional beam 201. The radio communication device 300 measures the reception power of the sequentially transmitted directional beams 201 with its own directional beam width as a maximum beam width. The radio communication device 300 shares identification information of the directional beam 201 from which the maximum reception power is obtained among the sequentially transmitted directional beams 201 with the radio communication device 200. Thus, the selection of the directional beam 201 is completed. The radio communication device 300 may transmit the radio signal to the radio communication device 200, using a directional beam.

In "5 GNR", the radio communication device 200 (base station device) sequentially transmits a plurality of signal blocks "synchronization signal/physical broadcast channel (SS/PBCH)" to the radio communication device 100 (terminal station device) in a time division manner for each directional beam. The radio communication device 100 specifies a directional beam from which the maximum reception power is obtained on the basis of the plurality of signal blocks. The radio communication device 300 feeds back the identification information (ID) of the specified directional beam to the radio communication device 200. Thus, the initial selection of the directional beam 201 is completed.

A method of selecting the directional beam includes a method in which the directional beam is selected by a first radio communication device of a first radio communication device (initiator) and a second radio communication device (responder), a method in which the directional beam is selected by the second radio communication device, and a method in which the directional beam is selected by both the first radio communication device and the second radio communication device. Hereinafter, in order to simplify the description, the method of selecting the directional beam only by the initiator will be described as an example.

As described above, in the radio communication system using a high frequency band, the radio wave used as the carrier wave has high linearity. Therefore, a radio communication system using a high frequency band is highly likely to execute radio communication using a line-of-sight wave.

In the radio communication using the line-of-sight wave, because the radio communication device 200 forms the directional beam in a direction in which the radio communication device 300 opposite to the radio communication device 200 exists, the reception power in the radio communication device 300 is a maximum. Therefore, even if the direction of the directional beam 201 used for radio communication fluctuates when the propagation path of the radio signal fluctuates depending on the movement of the radio communication device 300, the range of the fluctuation is limited to the range near the already selected directional beam 201.

For example, when the directional beam 201-5 is initially selected for the transmission of the radio signal at a first past time, there is a low likelihood that the directional beam 201-1 which does not exist in the vicinity of the directional beam 201-5 will be selected for the transmission of the radio signal at a second time following the first time. Further, there is a high likelihood that the directional beam 201-4 or the directional beam 201-6 existing in the vicinity of the directional beam 201-5 will be selected.

FIG. 6 is a diagram showing an example of radio communication using reflected waves. There is a case where the radio communication system using a high-frequency band may execute the radio communication using reflected waves. For example, when a shield 400 exists between the radio communication device 200 and the radio communication device 300, the radio communication device 200 executes the radio communication with the radio communication device 300, using reflected waves generated by reflection of the radio signal of the directional beam 201-1 by the reflection object 500. Further, the radio communication device 200 may execute the radio communication with the radio communication device 300, using reflected waves generated by reflection of the radio signal of the directional beam 201-9 by the reflection object 501.

In FIG. 6, even when the directional beam 201-1 is initially selected for the transmission of the radio signal at the first past time, there is a low possibility that the directional beam 201-2 existing in the vicinity of the directional beam 201-1 is selected for the transmission of the radio signal at the second time following the first time. The reason is that, even if the directional beam 201-2 is selected, since the shield 400 exists, the radio signal of the directional beam 201-2 is shielded by the shield 400.

When the radio communication is executed by utilizing the reflected waves generated by a reflection object 500 in the radio signal of the directional beam 201-1 selected at the first time, when another shield (not shown) enters the propagation path of the reflected waves and reception power of the reflected waves is reduced, there is a possibility that the directional beam 201-9 is selected at the second time. This is because the radio signal of the directional beam 201-9 is not shielded by the shield 400.

In general, it is difficult to determine which of the line-of-sight wave and the reflected wave is used, on the basis of information on the propagation path obtained in each radio communication device. For example, in NPD 3, the radio communication device on the transmission side transmits a known reference signal to the radio communication device on the reception side in advance. The radio communication device on the reception side estimates the propagation path on the basis of a propagation coefficient obtained from a parameter change amount between a reference signal received by the radio communication device on the reception side and a known reference signal. Thus, the propagation coefficient is derived regardless of which of the line-of-sight wave and the reflected wave is used.

CITATION LIST

Non Patent Documents

[NPD 1] Takinami and three others, "Standardization Trend and Elemental Technology for Millimeter Wave Band Radio LAN System," IEICE Communication Society Magazine, No. 38, Autumn 2016, pp. 100-106

[NPD 2] IEEE, "Part 11: Radio LAN Medium Access Control (MAC) and Physical Layer (PHY) Specifications Amendment 3: Enhancements for Very High Throughput in the 60 GHz Band" (IEEE Std 802.11ad-2012), Dec. 12, 2028

[NPD 3] Taira and three others, "A transmission path estimation method and estimation accuracy in a multi-carrier system", The Transactions of the Institute of Electronics, Information and Communication Engineers B, Vol. J88-B, No. 4, pp. 751-761

SUMMARY OF INVENTION

Technical Problem

Because the radio communication device is controlled on the basis of a determination result of which of the line-of-sight wave and the reflected wave is used, the efficiency of the radio communication can be improved. However, when the propagation path is simply estimated on the basis of the reference signal, the propagation coefficient corresponding to the amplitude attenuation and the phase rotation is simply derived. In other words, it is difficult to estimate which of the line-of-sight wave and the reflected wave is used, on the basis of the derived propagation coefficient. In this way, there is a problem that it is not possible to determine which of the line-of-sight wave and the reflected wave is used for radio communication.

In view of such circumstances, an object of the present invention is to provide a determining method and a radio communication device capable of determining which of line-of-sight waves and reflected waves is used for radio communication.

Solution to Problem

An aspect of the present invention is a determining method which is executed by a radio communication device, the method including: a radio step of executing radio communication, using two or more directional beams selected from a plurality of directional beams; and a determination step of determining which of line-of-sight waves and reflected waves is used for the executed radio communication, on the basis of an amount of variation in directions between the two or more directional beams used at different times.

An aspect of the present invention is a radio communication device that includes a radio unit which executes a radio communication, using two or more directional beams selected from a plurality of directional beams; and a determination unit which determines which of line-of-sight waves and reflected waves is used for the executed radio communication, on the basis of an amount of variation in directions between the two or more directional beams used at different times.

Advantageous Effects of Invention

According to the present invention, it is possible to determine which of line-of-sight waves and reflected waves is used for radio communication.

DESCRIPTION OF EMBODIMENTS

An embodiment of the present invention will be described in detail with reference to the diagrams.

Figure 1:
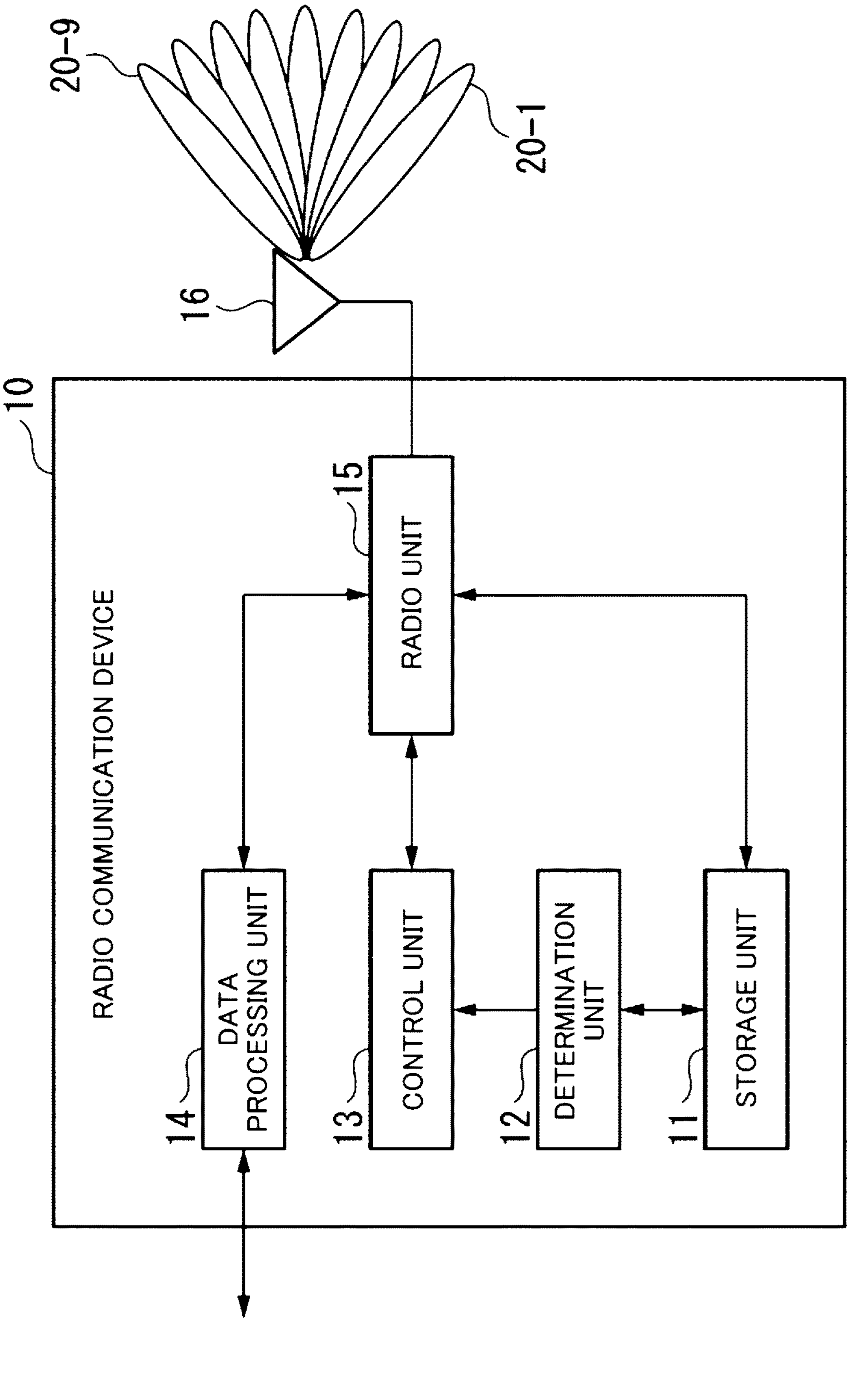
FIG. 1 is a diagram showing a configuration example of a radio communication device according to an embodiment.

FIG. 1 is a diagram showing a configuration example of a radio communication device 10 according to an embodiment. The radio communication device 10 of a radio communication system includes a storage unit 11, a determination unit 12, a control unit 13, a data processing unit 1414, a radio unit 15, and an antenna 16.

The storage unit 11 acquires information on a directional beam at present used for radio communication from the radio unit 15. The information related to the directional beam is, for example, identification information of the directional beam 20. The information related to the directional beam may be, for example, direction information (angle information) of a directional beam 20. The storage unit 11 accumulates information on the directional beam at present used for radio communication in association with time. Thus, the storage unit 11 stores information (history information) related to the directional beam used for radio communication in time series.

The storage unit 11 outputs information on a directional beam used for radio communication in the past to the determination unit 12. For example, the storage unit 11 outputs information on the directional beam used for radio communication at a first past time to the determination unit 12. The storage unit 11 may output information on the directional beam used for radio communication at a second past time following the first time to the determination unit 12. The storage unit 11 may output information on the directional beam used for the radio communication at the current time following the second time to the determination unit 12.

The determination unit 12 derives an amount of variation in directions between two or more directional beams 20 used for radio communication at different past times on the basis of information on the directional beams used for radio communication in the past. For example, the determination unit 12 derives an amount of variation in directions between two or more directional beams 20 on the basis of information on the directional beams used for radio communication at the first past time and information on the directional beams used for radio communication at the second past time following the first time.

The determination unit 12 determines whether radio communication in the past is radio communication using line-of-sight waves or reflected waves on the basis of the direction between two or more directional beams 201 used in radio communication at different times in the past. For example, the determination unit 12 determines whether past radio communication is radio communication using line-of-sight waves or reflected waves, on the basis of a difference between the direction of the directional beam 20 at the first past time and the direction of the directional beam 20 at the second past time (angular difference). The determination unit 12 outputs a determination result (judgment result) indicating which of the line-of-sight waves and the reflected waves is used to the control unit 13.

The control unit 13 selects the directional beam 20 having the maximum reception power in another radio communication device (not shown) opposite to the radio communication device 10 (wireless communication apparatus) from a plurality of formable directional beams (directional beam 20-1 to directional beam 20-9), on the basis of the determination result indicating which of the line-of-sight waves and the reflected waves is used for radio communication. Here, the angular differences between the adjacent directional beams 20 may be equal. The control unit 13 controls the radio unit 15 at the current time to execute radio communication, using the selected directional beam 20.

The data processing unit 14 executes data processing (radio communication method) for operating as a radio communication device that supports a predetermined communication standard. For example, the data processing unit 14 acquires a connection request, which is received from another radio communication device (not shown) operating as a terminal station device, from the radio unit 15. The data processing unit 14 executes connection management of another radio communication device (not shown) that has transmitted the connection request on the basis of the connection request. For example, the data processing unit 14 outputs data input from a host network (not shown) to the radio unit 15. For example, the data processing unit 14 outputs data, which is input from the radio unit 15, to a higher network (not shown). The data processing unit 14 may output the data, which is input from the radio unit 15, to an interface of an upper network (not shown).

The radio unit 15 executes radio communication using the selected directional beam 201, thereby transmitting the data acquired from the data processing unit 14 to another radio communication device (not shown). The radio unit 15 outputs the data received from another radio communication device (not shown) by radio communication to the data processing unit 14.

Next, the amount of variation (index) in the direction between the directional beams 201 will be described.

The amount of variation in the direction between two or more directional beams 20 used for radio communication at different past times is expressed, for example, using an angular difference (relative angle) between the directional beams. When executing the beam sweep, the radio unit 15 may form the directional beam 20 at a constant angular difference, for example, in accordance with control by the control unit 13. That is, the radio unit 15 may form, for example, a group of directional beams 20 at equal intervals.

In such a radio communication device 10, identification information of the directional beam 20 and a direction (angle) of the directional beam 20 are associated in advance. Therefore, the determination unit 12 can derive an angular difference between the directional beams 20 on the basis of the identification information of the directional beams 20.

The radio unit 15 may execute the beam sweep on a planar (two-dimensional) angular difference "φ" or may perform beam sweep on a three-dimensional (three-dimensional) angular difference "θ".

Figure 2:
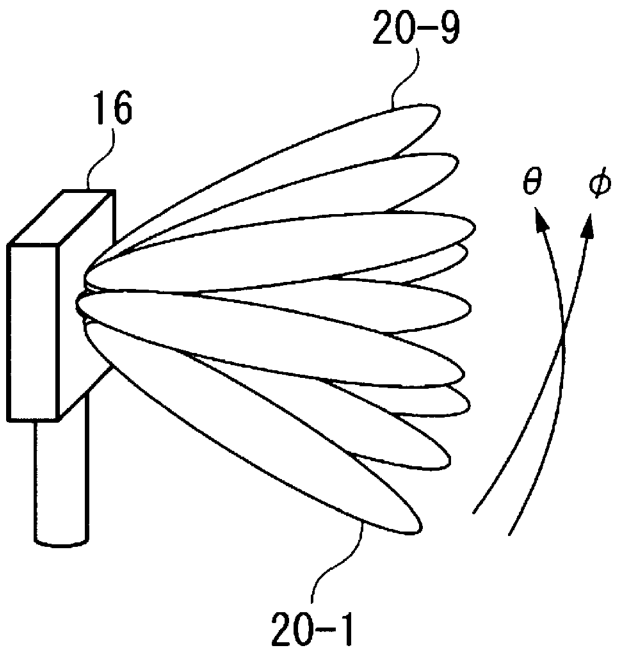
FIG. 2 is a diagram showing an example of a three-dimensional beam sweep according to the embodiment.

FIG. 2 is a diagram showing an example of a three-dimensional beam sweep in an embodiment. The determination unit 12 derives a three-dimensional angular difference "θ" between the directional beams 20 as an amount of variation in the direction between the directional beams 20 on the basis of an inner product of the direction vectors of the directional beams 20, as shown by Formula (1).

[Math. 1]

$$\cos\theta = \frac{\vec{b_1} \cdot \vec{b_2}}{|\vec{b_1}||\vec{b_2}|} \tag{1}$$

Here, "→|$b_1$|" and "→|$b_2$|" are vectors each representing the direction of the directional beam.

When the directional beams are formed using an analogue phase shifter, the amount of variation in the direction between the directional beams 20 may be expressed, for example, using the amount of phase shift of the directional beams. The directivity of the antenna 16 (linear array) having N elements is represented by Formula (2).

[Math. 2]

$$E(\theta, \phi) = g(\theta, \phi)\sum_{n=0}^{N-1} a_n \exp(j\psi_n)\exp\left(j\frac{2\pi}{\lambda}nd\sin\theta\right) \tag{2}$$

Here, "λ" represents the wavelength of a radio wave used for the Carrier wave. "j" represents an imaginary unit. "π" represents a circumferential ratio. "n" represents a number assigned to the element. "d" represents an interval of the element.

The amount of phase shift of the directional beam formed using the analogue phase shifter is expressed by Formula (3).

[Math. 3]

$$\psi_n = -\frac{2\pi}{\lambda}nd\sin\theta_0 \tag{3}$$

The directional beam 20 is formed in the direction of an angle "$\theta_0$". The amount of variation in the direction between the directional beams 20 may be expressed using the amount of phase shift shown in Formula (3).

When the directional beam is formed using a digital precoder, the amount of variation in the direction between the directional beams 20 may be expressed, for example, using a correlation coefficient between weight coefficients. The determination unit 12 derives a propagation path vector "h" to another radio communication device (not shown), using an arbitrary channel estimation method. The control unit 13 multiplies the transmission data by a conjugate transposition vector of the propagation path vector "h" as a weight vector. Thus, the reception power of another radio communication device (not shown) is maximized.

The correlation between the weight vectors decreases depending on the separation in the direction between the directional beams (separation between the radio communication devices). Therefore, the amount of variation in the direction between the directional beams 20 may be expressed, using the correlation between the weight vectors.

Next, the operation of the radio communication device 10 will be described.

Figure 3:
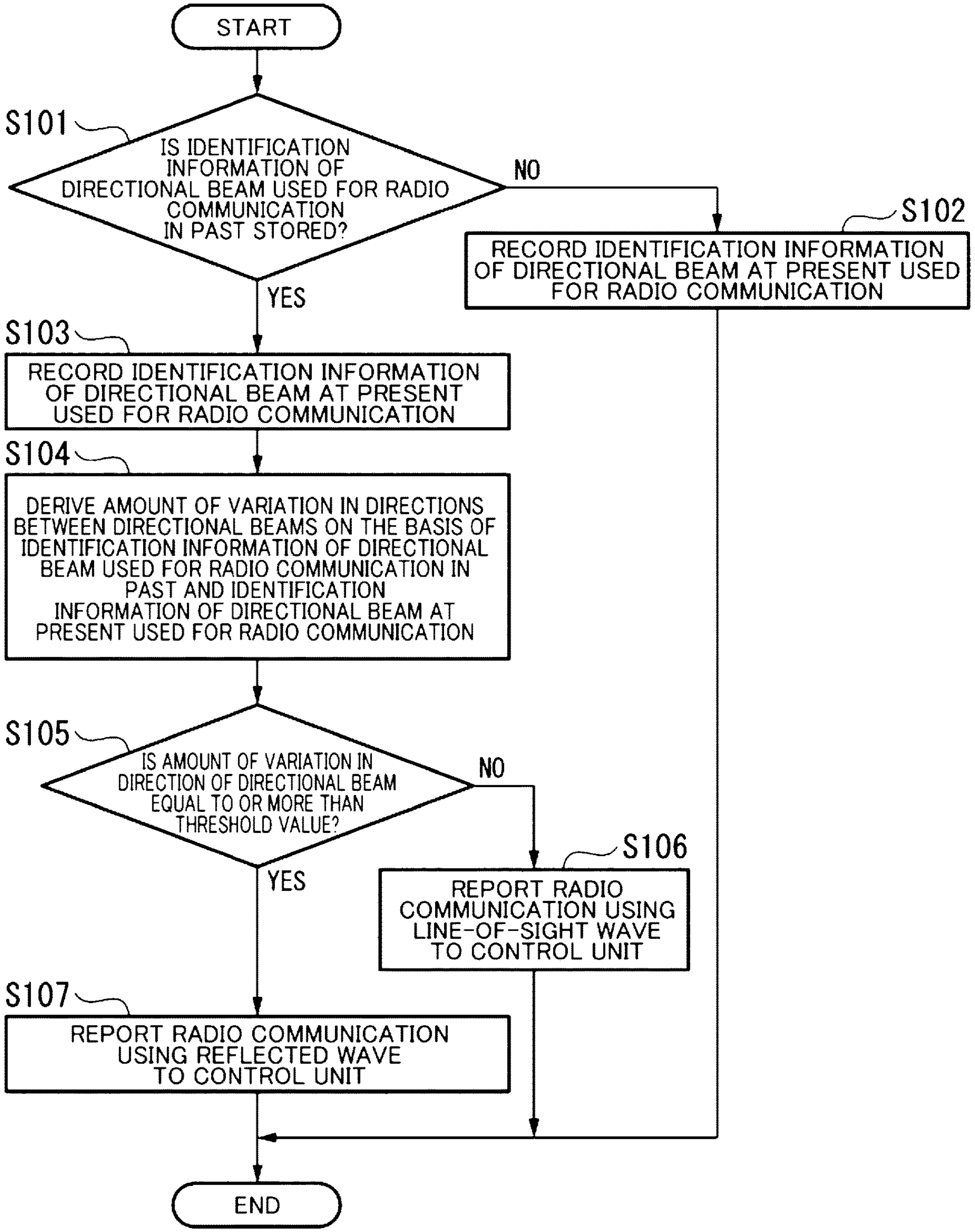
FIG. 3 is a flowchart showing an operation example of the radio communication device according to the embodiment.

FIG. 3 is a flow chart showing an example of operation of the radio communication device 10 in the embodiment. When the beam sweep is executed, the radio communication device 10 executes the operation of the flowchart shown in FIG. 3. The radio unit 15 determines whether identification information of the directional beam used for radio communication in the past is stored in the storage unit 11 (step S101).

When the identification information of the directional beam used for the radio communication in the past is not stored in the Storage unit 11 (step S101: NO), the radio unit 15 records the identification information (for example, the directional beam 20-1) of the directional beam 20 used for the radio communication at present in the storage unit 11 (step S102). The radio communication device 10 ends the processing shown in FIG. 3.

When the beam identification information of the directional beam used for the radio communication in the past is stored in the storage unit 11 (step S101: YES), the radio unit 15 records the identification information of the directional beam 20 used for the radio communication at present in the storage unit 11 (step S103). The determination unit 12 derives an amount of variation of directions between the directional beams 20, on the basis of identification information of the directional beams 20 used for radio communication in the past and identification information of the directional beams 20 used for radio communication at present (step S104).

The determination unit 12 determines whether an amount of variation in directions between the directional beams 20 is equal to or greater than a threshold value (step S105). When an amount of variation in directions between the directional beams 20 is less than a threshold value (step S105: NO), the determination unit 12 notifies a control unit 13 that the radio communication in the past is radio communication using line-of-sight waves (step S106). When the amount of variation in directions between the directional beams 20 is equal to or greater than a threshold value (step S105: YES), the determination unit 12 notifies the control unit 13 that the radio communication in past is radio communication using reflected waves (step S107).

As described above, the radio unit 15 (radio communicator) executes the radio communication using two or more directional beams 20 selected from the plurality of directional beams 20. The determination unit 12 (determiner) determines which of line-of-sight waves and reflected waves is used for the executed radio communication, on the basis of an amount of variation in directions between two or more directional beams used at different times. For example, the determination unit 12 determines that the executed radio communication is radio communication using reflected waves, when the amount of variation of the direction is equal to or greater than a threshold value.

In this way, by deriving the amount of variation in directions between the directional beams on the basis of the history information of the directional beams used for the radio communication in the past, it is possible to determine which of the line-of-sight wave and the reflected wave is used for the radio communication. In addition, a flexible communication control can be performed in accordance with the natures of the propagation path of the radio signal. For example, the amount of variation of the directional beam 20 is assumed to be small in the line-of-sight environment. For this reason, the radio communication device 10 may reduce the communication overhead by performing beam sweep only in the vicinity of a terminal station device (not shown). In the non-line-of-sight environment, the amount of variation of the directional beam 20 is assumed to increase. Therefore, the radio communication device 10 may increase the stability of communication by widening the range of the beam sweep. In this way, the radio communication device 10 may execute the flexible control so that the reduction of the communication overhead and the stability of the communication are compatible.

In the above description, the determination unit 12 derives a variation in directions between the directional beams 20, on the basis of the directional beams used for the radio communication at the first past time and the directional beams used for the radio communication at the second past time. The storage unit 11 may store an amount of variation in directions between the time-series directional beams 20. The determination unit 12 may determine which of line-of-sight waves and reflected waves is used for the past radio communication on the basis of a moving average or a weighted average of an amount of variation in directions between the directional beams 20.

Hardware Configuration Example

Figure 4:
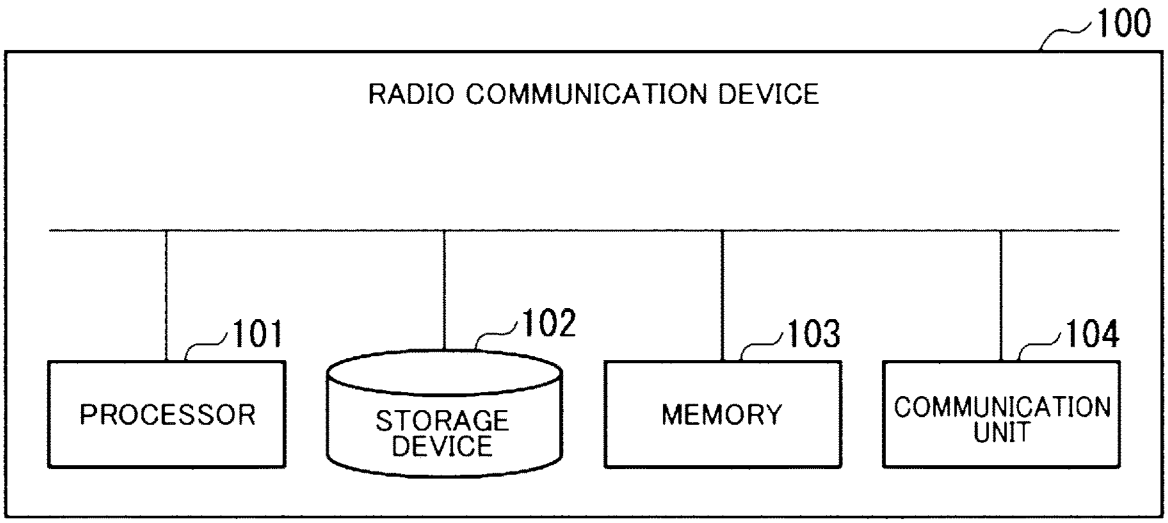
FIG. 4 is a diagram showing a hardware configuration example of the radio communication device according to the embodiment.
Figure 5:
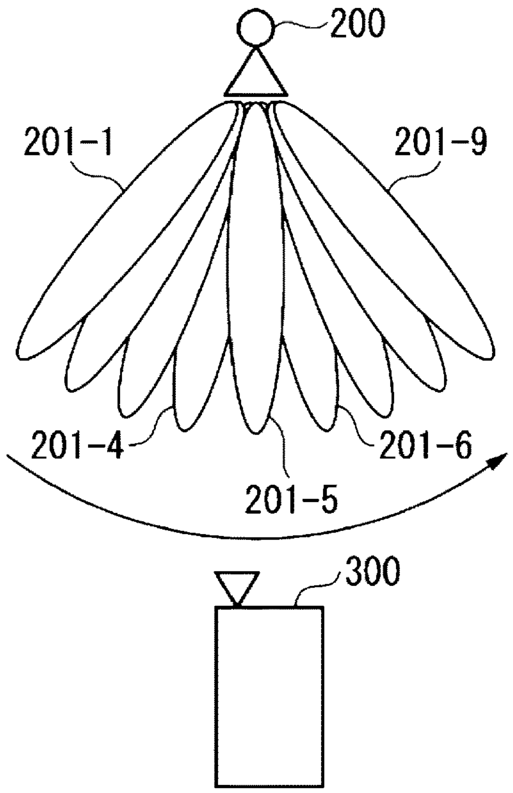
FIG. 5 is a diagram showing an example of a radio communication device using beamforming in a millimeter wave band.
Figure 6:
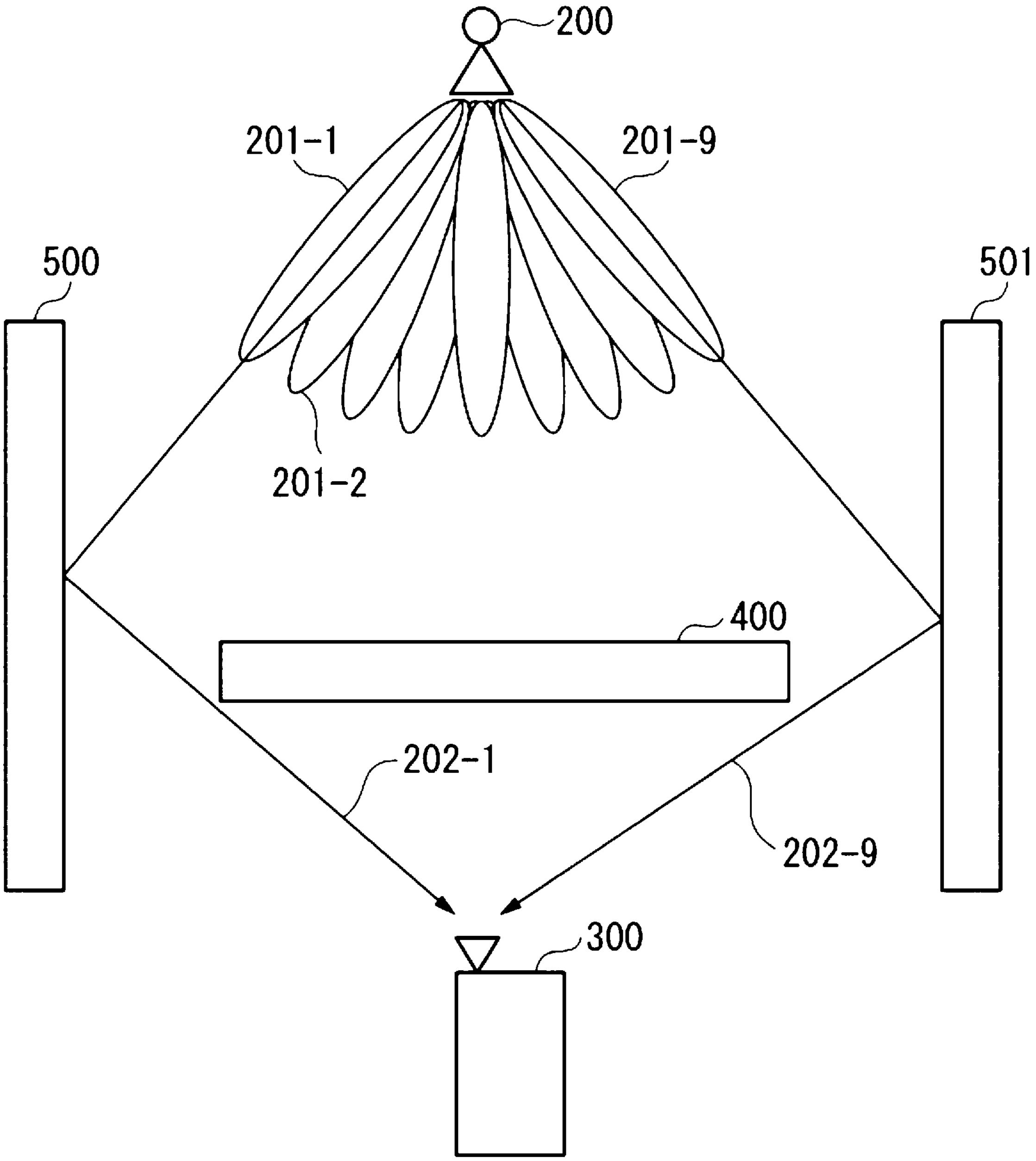
FIG. 6 is a diagram showing an example of the radio communication device using reflected waves.

FIG. 4 is a diagram showing a hardware configuration example of a radio communication device 100 according to an embodiment. The radio communication device 100 corresponds to the radio communication device 10. A part or all of each functional unit of the radio communication device 100 is implemented as software by a processor 101 such as a central processing unit (CPU) that executes a program stored in a storage device 102 having a non-volatile recording medium (non-temporary recording medium) and a memory 103. The program may be recorded on a computer-readable non-temporary recording medium. The computer-readable non-temporary recording medium is, for example, a portable medium such as a flexible disk, a magneto-optical disk, and a read only memory (ROM) or a compact disc read only memory (CD-ROM), or a non-temporary recording medium such as a storage device such as a hard disk built in a computer system. A communication unit 104 executes the prescribed communication processing. The communication unit 104 may acquire data and a program.

A part or all of the functional units of the radio communication device 100 may be implemented, using hardware including an electronic circuit or circuitry in which a large scale integrated circuit (LSI), an application specific integrated circuit (ASIC), a programmable logic device (PLD), a field programmable gate array (FPGA), or the like is used.

Although the embodiment of the present invention has been described in detail with reference to the drawings, a specific configuration is not limited to this embodiment, and design within the scope of the gist of the present invention, and the like are included.

Industrial Applicability

The present invention is applicable to a radio communication system.

REFERENCE SIGNS LIST

10 Radio communication device
11 Storage unit
12 Determination unit
13 Control unit
14 Data processing unit
15 Radio unit
16 Antenna
20 Directional beam
100 Radio communication device
101 Processor
102 Storage device
103 Memory
104 Communication unit
200 Radio communication device
201 Directional beam
202 Propagation path
300 Radio communication device
400 Shield
500 Reflection object
501 Reflection object

The invention claimed is:

1. A determining method which is executed by a radio communication device, the method comprising:

executing a radio communication, using two or more directional beams selected from a plurality of directional beams;

determining which of line-of-sight waves and reflected waves is used for the executed radio communication, on the basis of an amount of variation in directions between the two or more directional beams used at different times; and controlling a radio unit to execute radio communication using the two or more directional beams selected based on a determination result indicating which of the line-of-sight waves and the reflected waves is used for radio communication, wherein, in a case where the two or more directional beams are formed using a digital precoder, the amount of variation is expressed using a correlation coefficient between weight coefficients, the step of determining includes deriving a propagation path vector to another radio communication device, using an arbitrary channel estimation method, and the step of controlling includes multiplying a transmission data to another radio communication device by a conjugate transposition vector of the propagation path vector as a weight vector of the weight coefficients.

2. The determining method according to claim 1, wherein determining that the executed radio communication is radio communication using reflected waves, when the amount of variation is equal to or greater than a threshold value.

3. A radio communication device comprising:

a radio communicator which executes a radio communication, using two or more directional beams selected from a plurality of directional beams;

a determiner which determines which of line-of-sight waves and reflected waves is used for the executed radio communication, on the basis of an amount of variation in directions between the two or more directional beams used at different times; and a controller configured to control the radio unit to execute radio communication using the two or more directional beams selected based on a determination result indicating which of the line-of-sight waves and the reflected waves is used for radio communication, wherein, in a case where the two or more directional beams are formed using a digital precoder, the amount of variation is expressed using a correlation coefficient between weight coefficients, the determinator is configured to derive a propagation path vector to another radio communication device, using an arbitrary channel estimation method, and the controller is configured to multiply a transmission data to another radio communication device by a conjugate transposition vector of the propagation path vector as a weight vector of the weight coefficients.

4. The radio communication device according to claim 3, wherein the determiner determines that the executed radio communication is radio communication using reflected waves, when the amount of variation is equal to or greater than a threshold value.

* * * * *